Figures 23, 24:
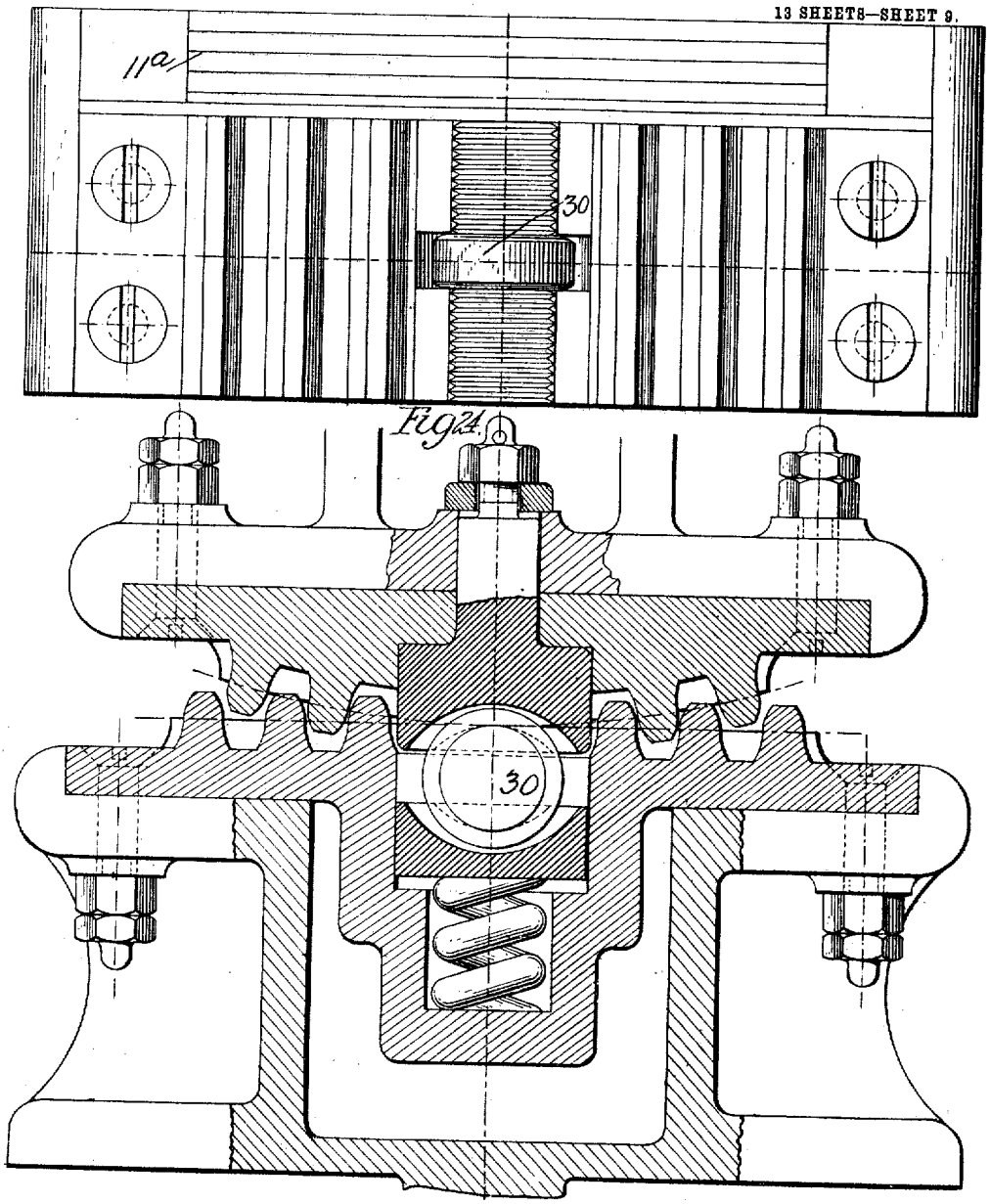

No. 844,440. PATENTED FEB. 19, 1907.
W. F. & W. BRAUN.
AUTOMATIC WEIGHING MACHINE.
APPLICATION FILED NOV. 13, 1906.
13 SHEETS—SHEET 1.
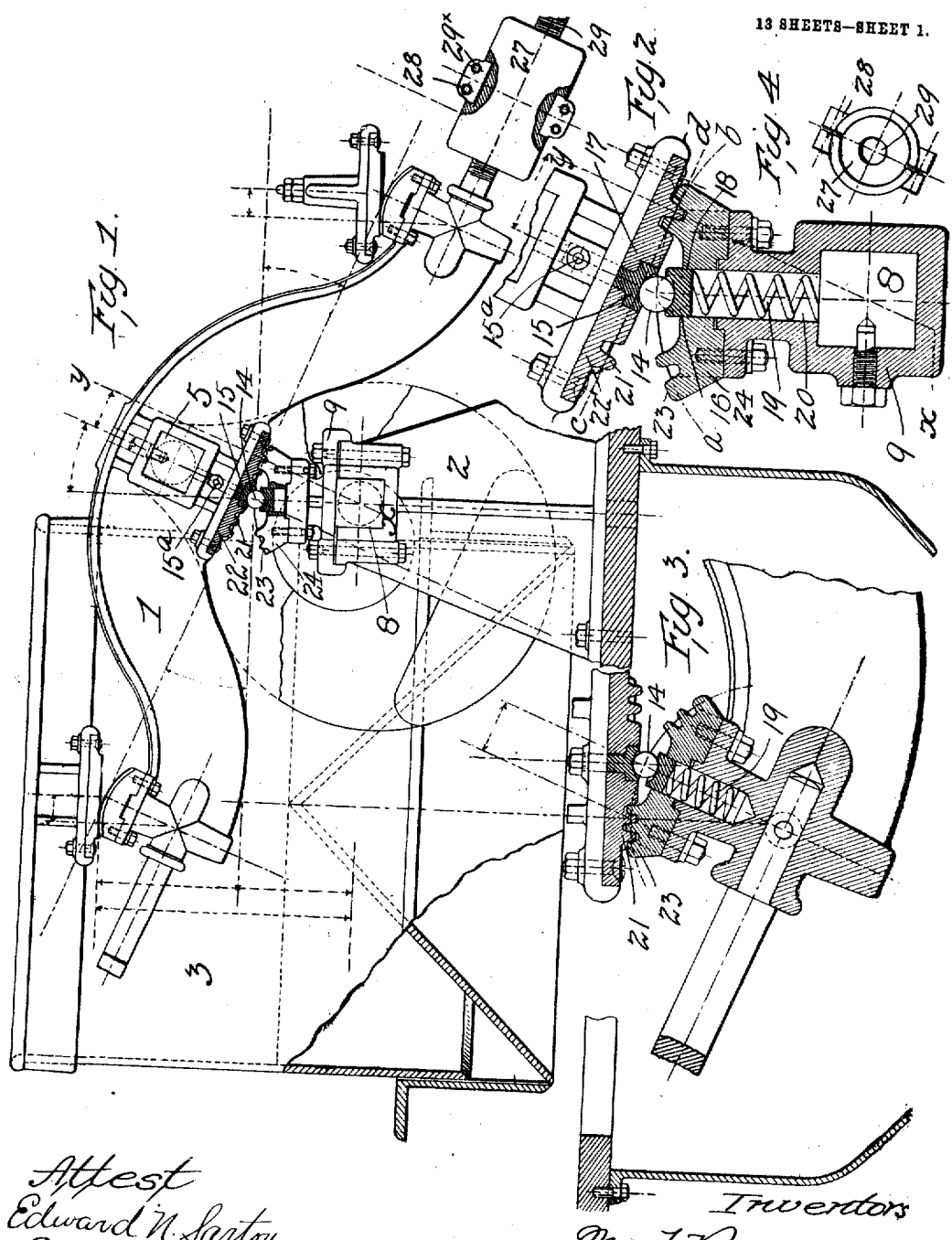

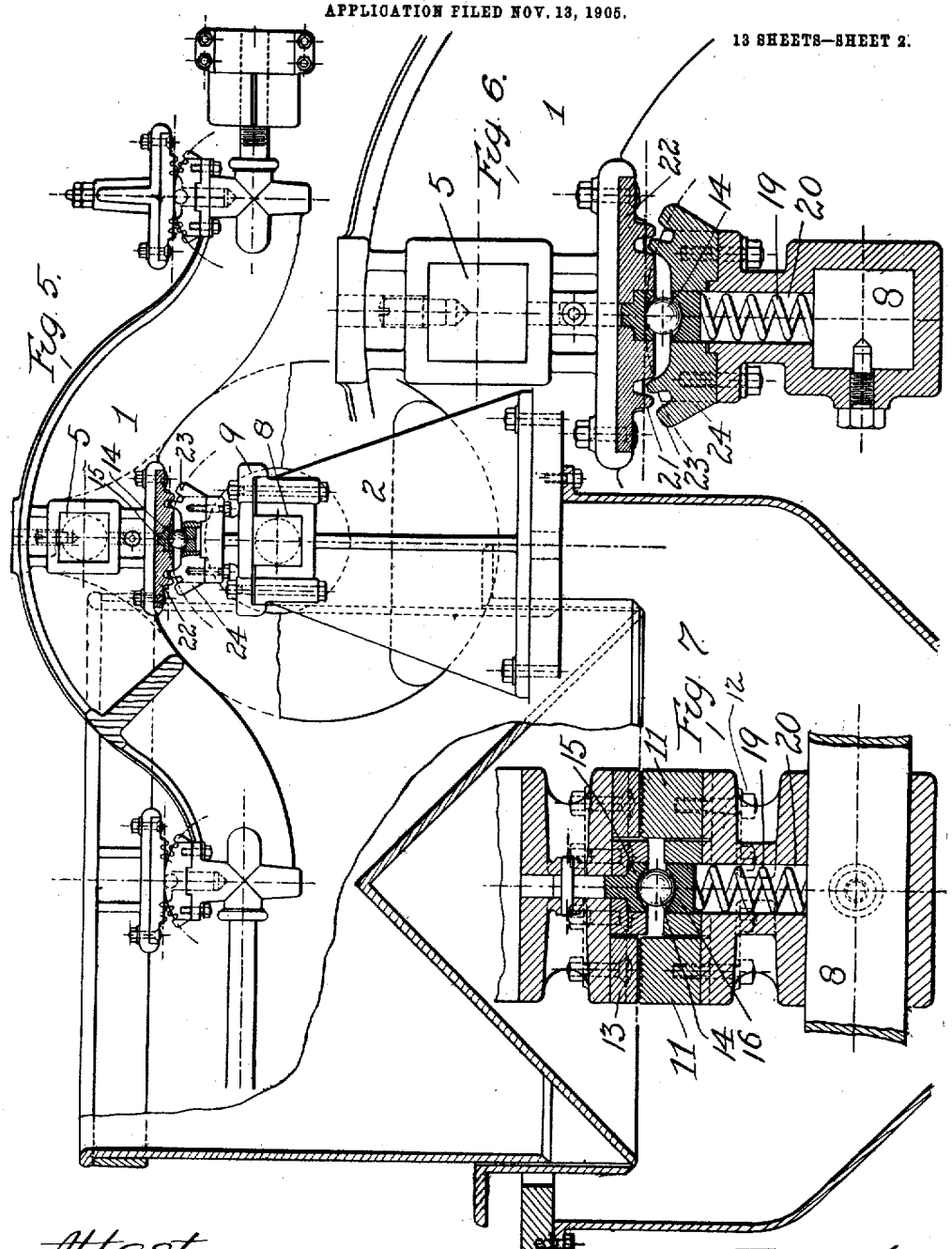

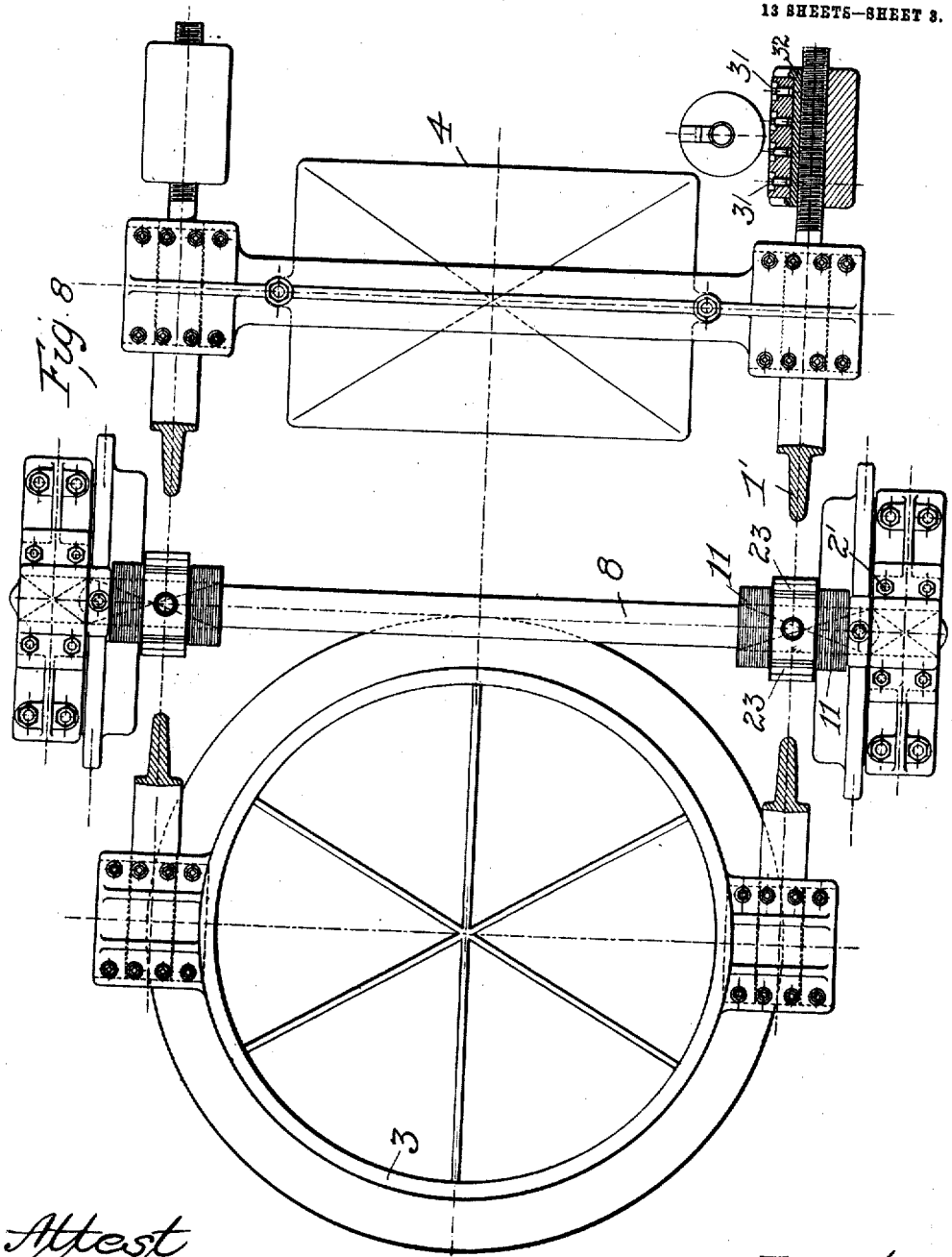

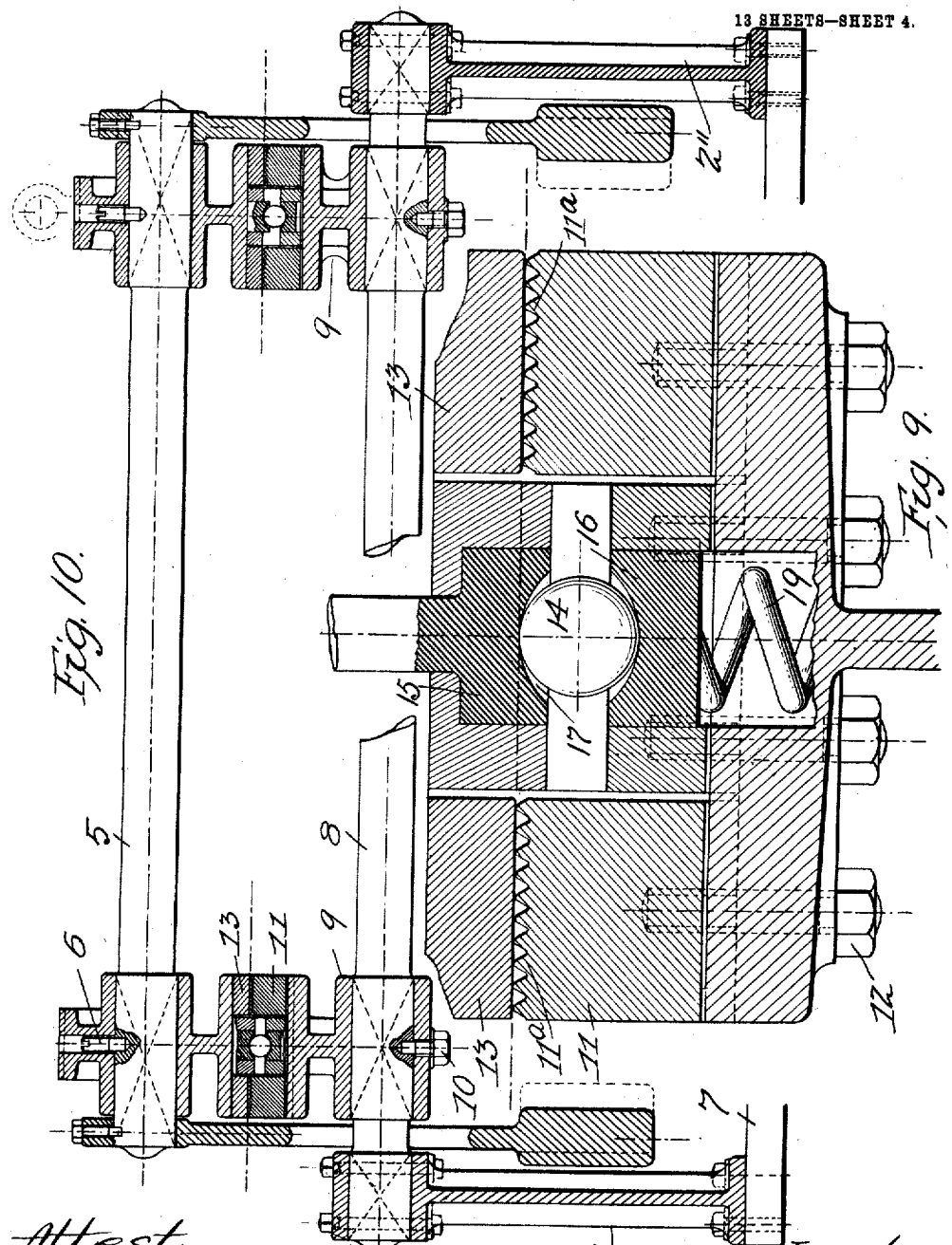

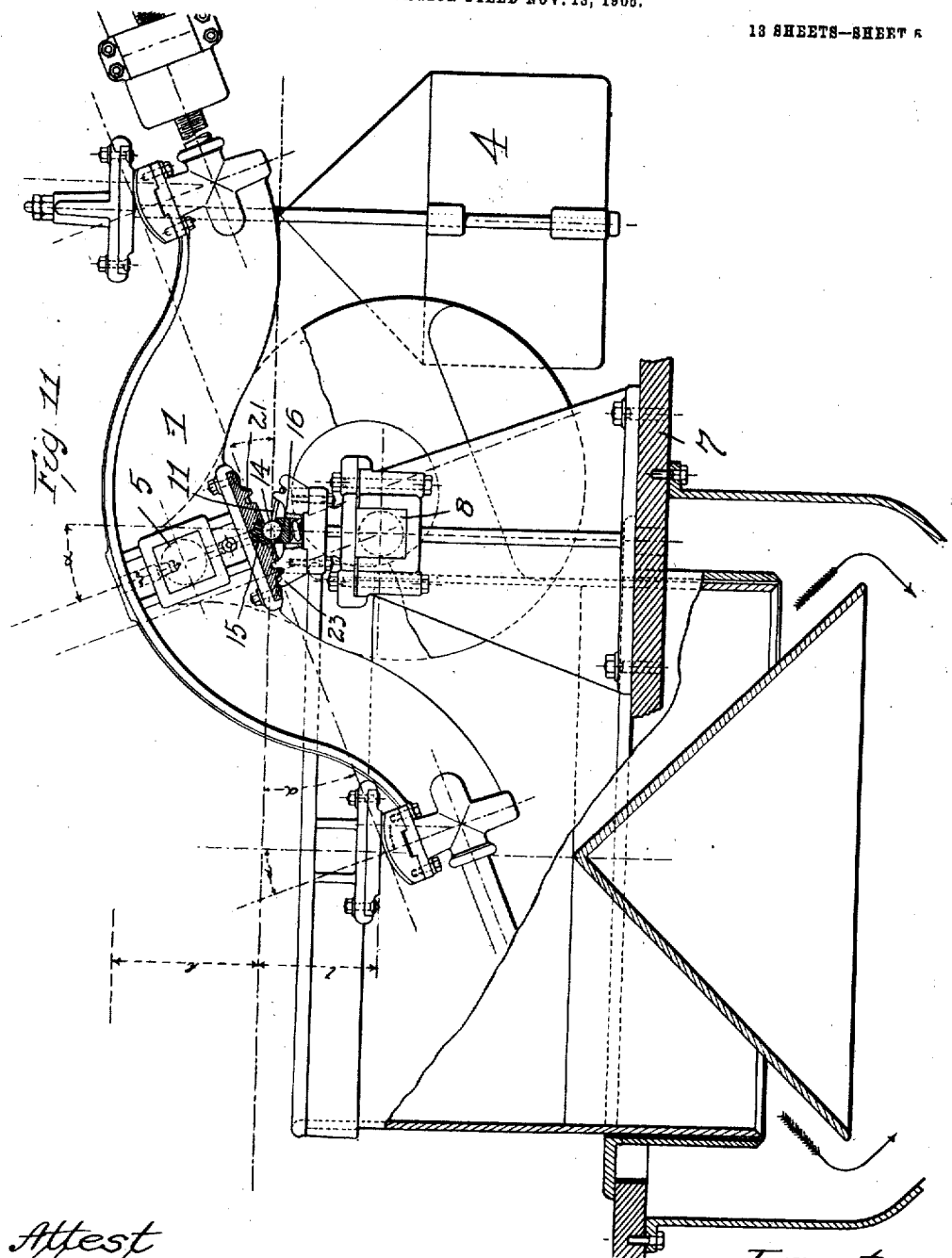

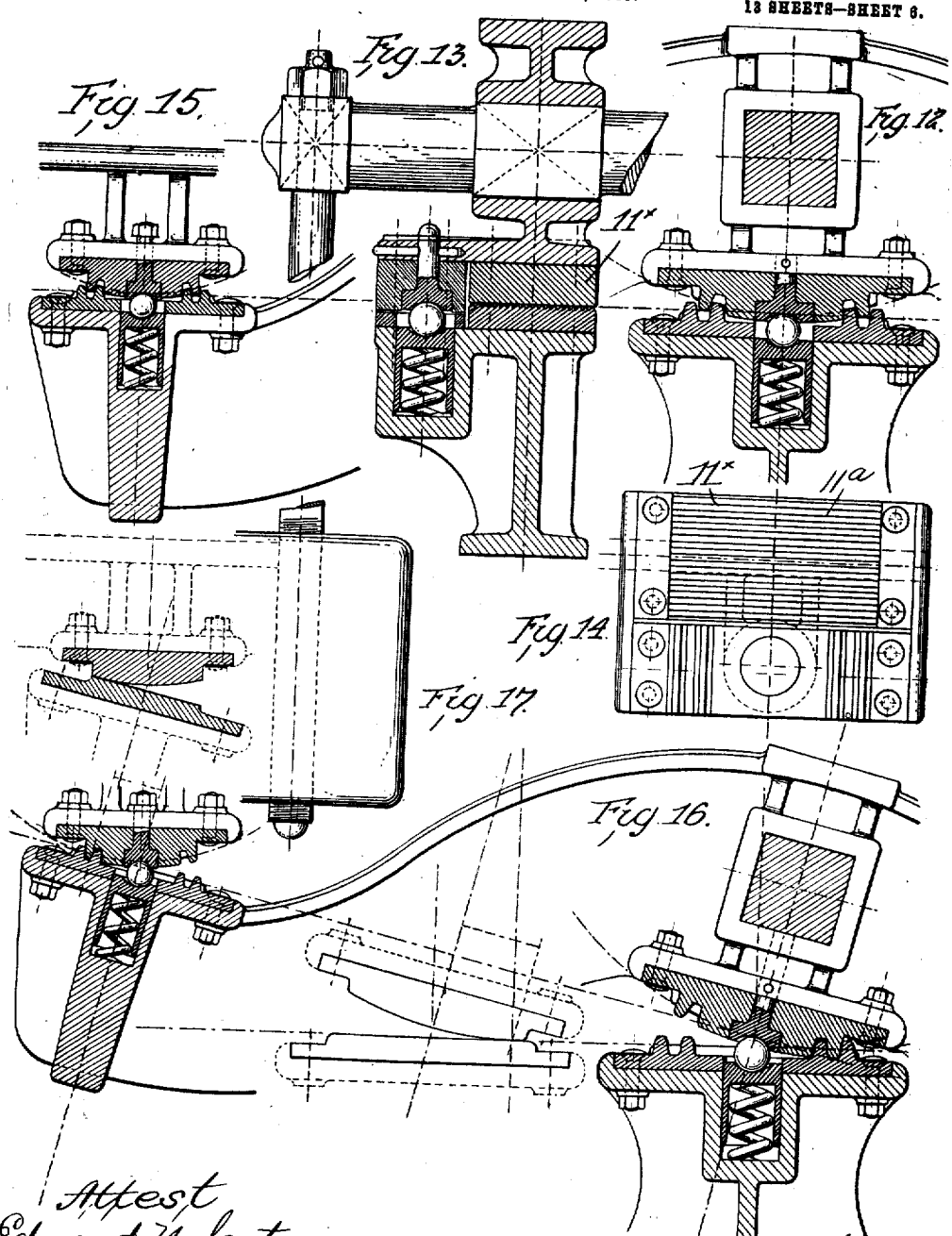

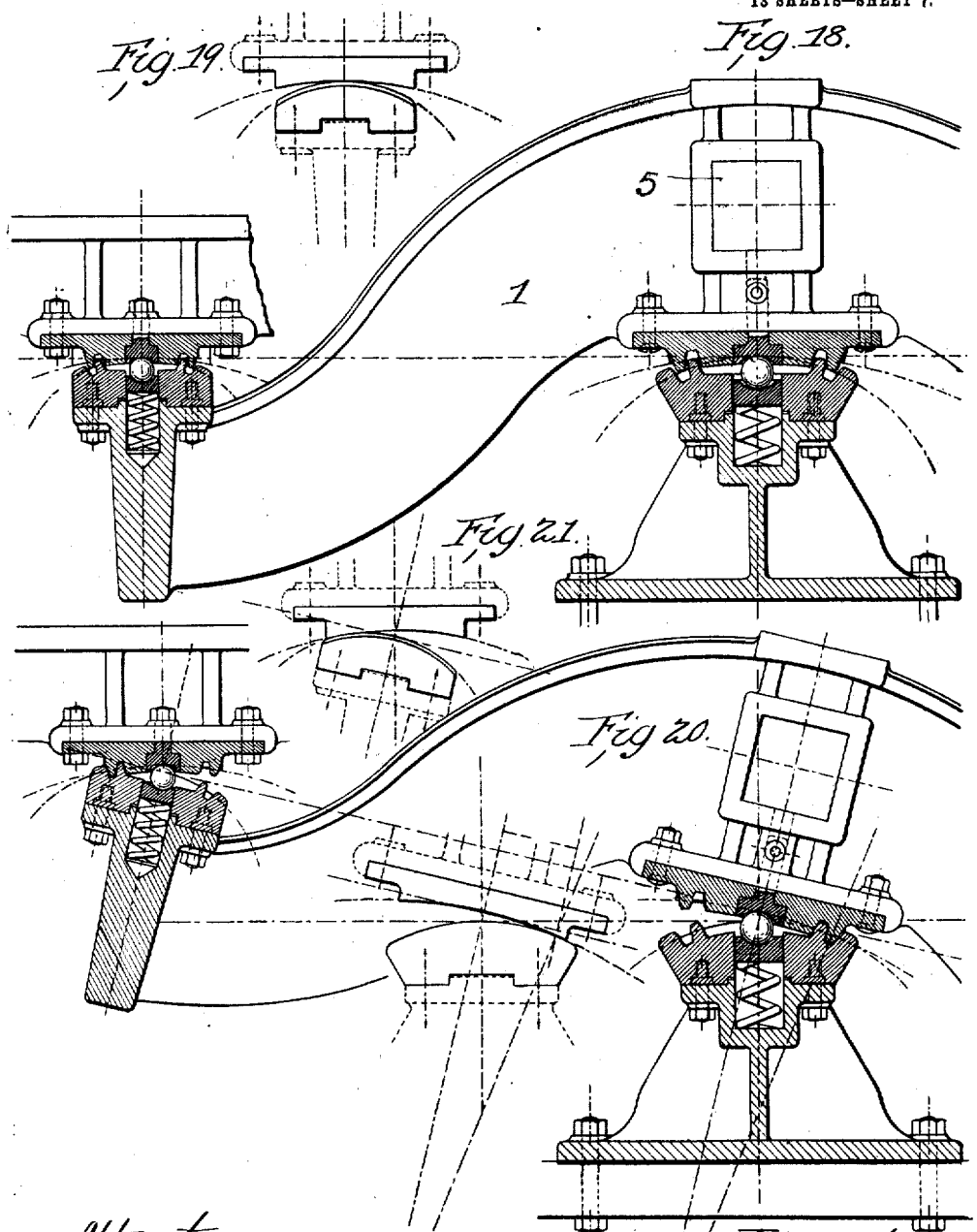

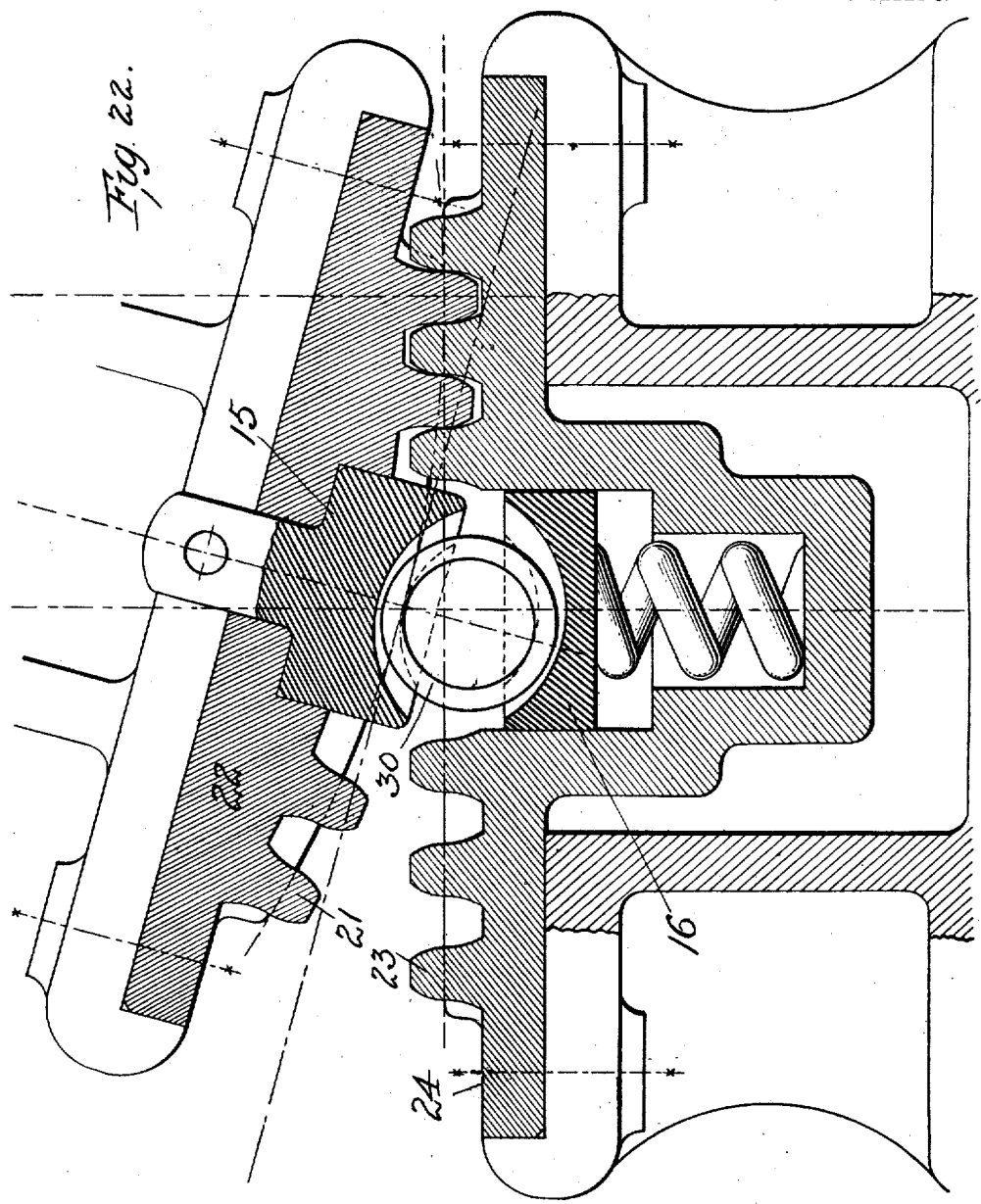

No. 844,440. PATENTED FEB. 19, 1907.
W. F. & W. BRAUN.
AUTOMATIC WEIGHING MACHINE.
APPLICATION FILED NOV. 13, 1905.

13 SHEETS—SHEET 9.

Attest
Edward N. Sartou
Edward L. Reed

Inventors
Wm F. Braun
Wm Braun
by Spear, Middleton, Donaldson & Spear
Attys.

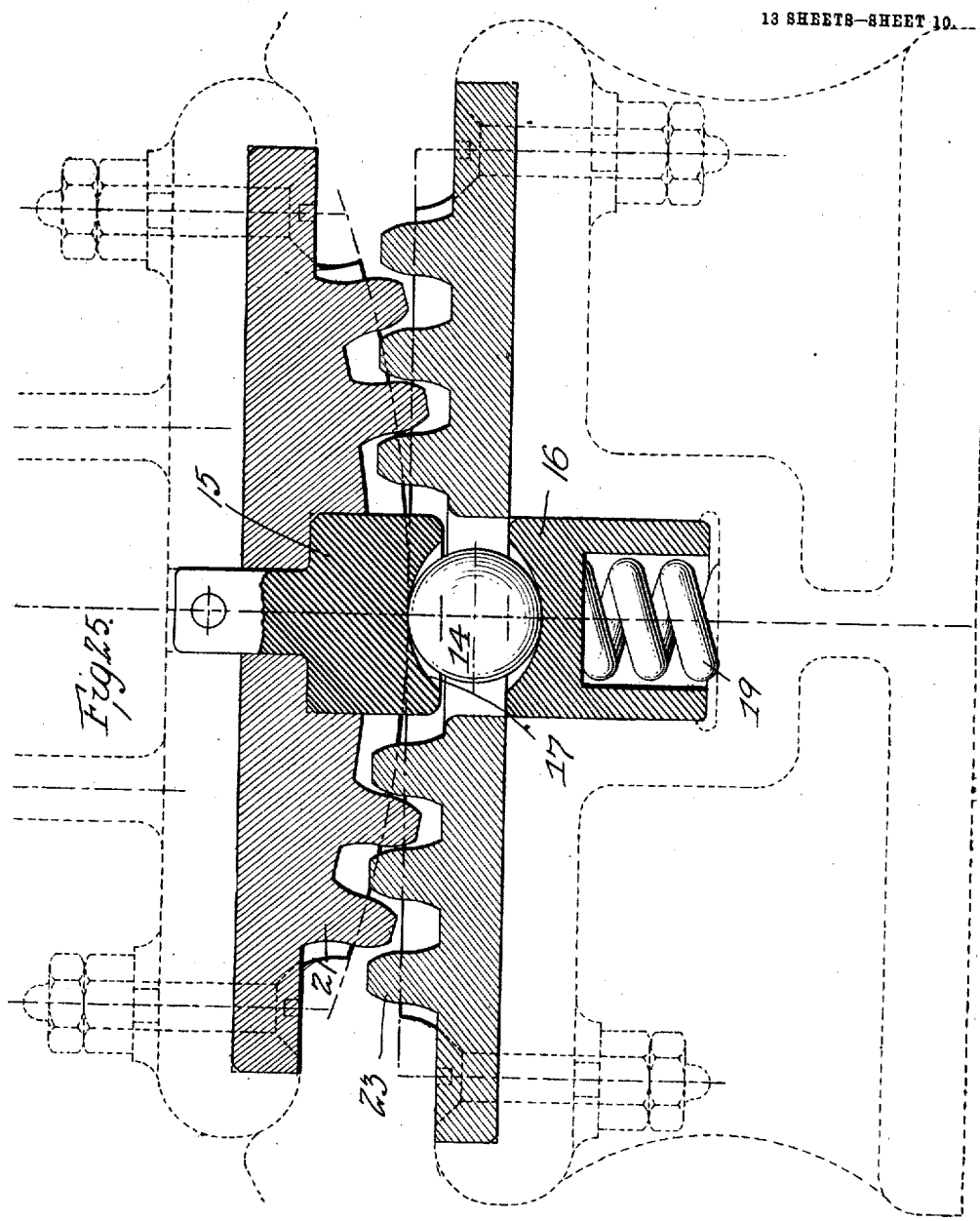

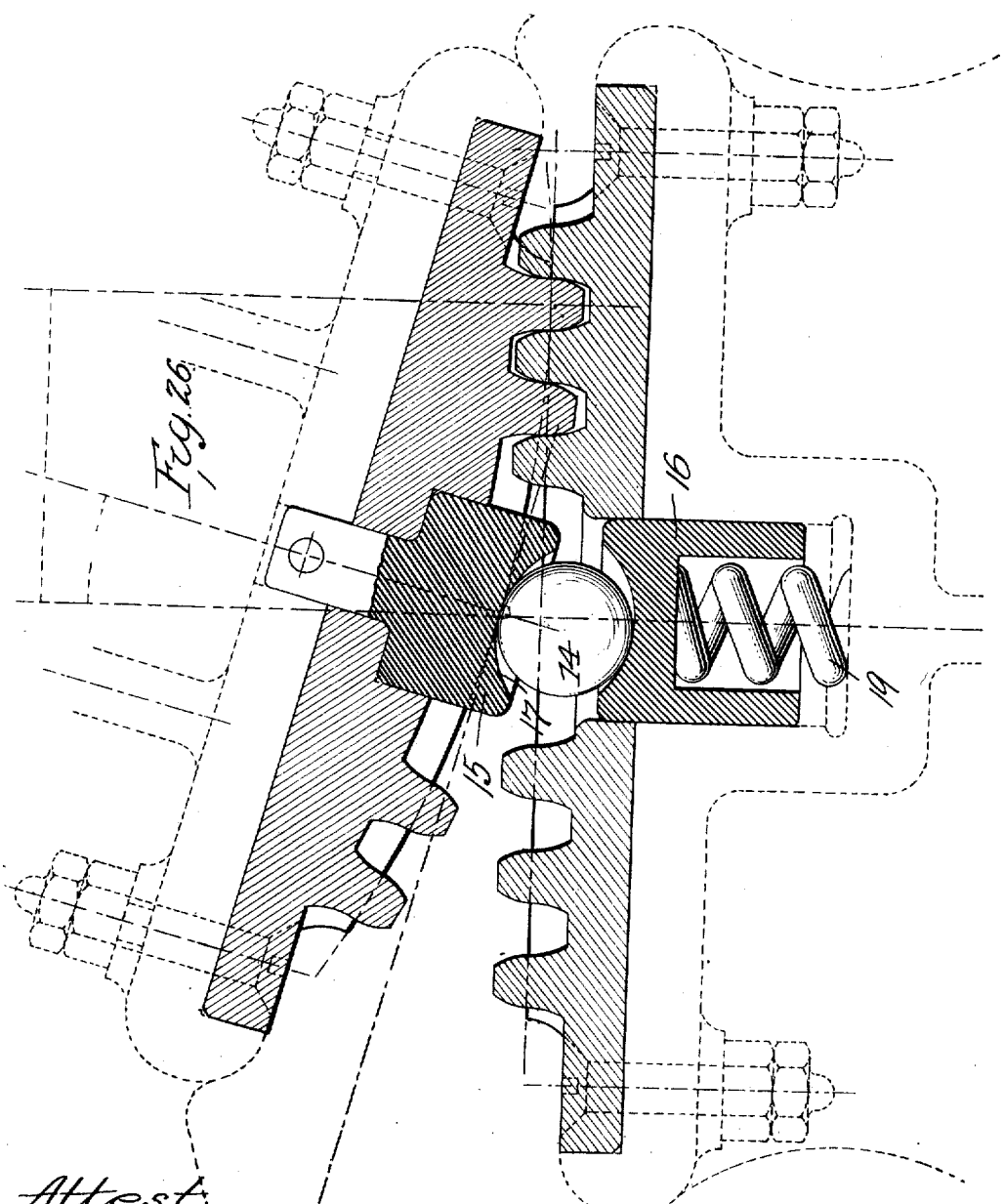

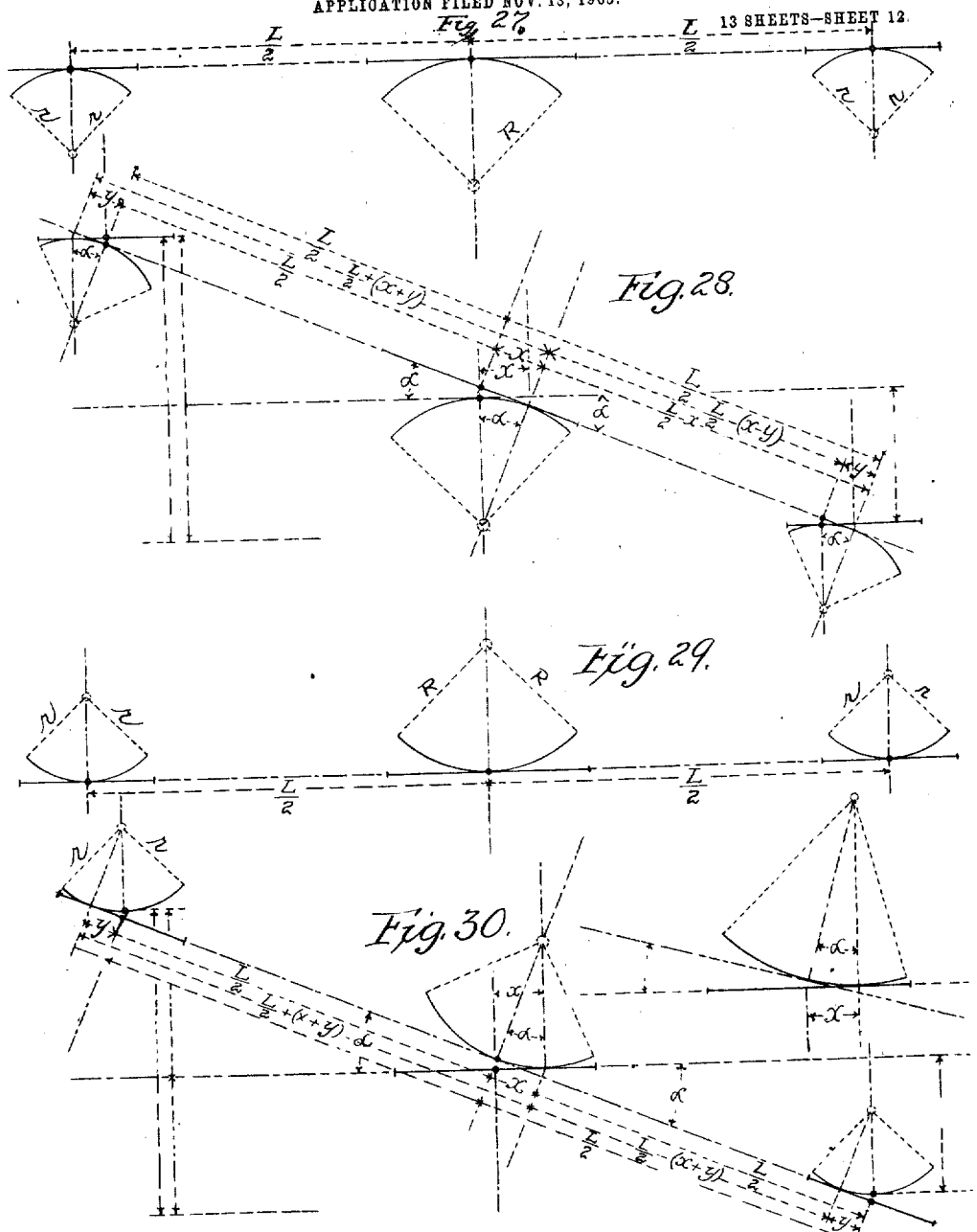

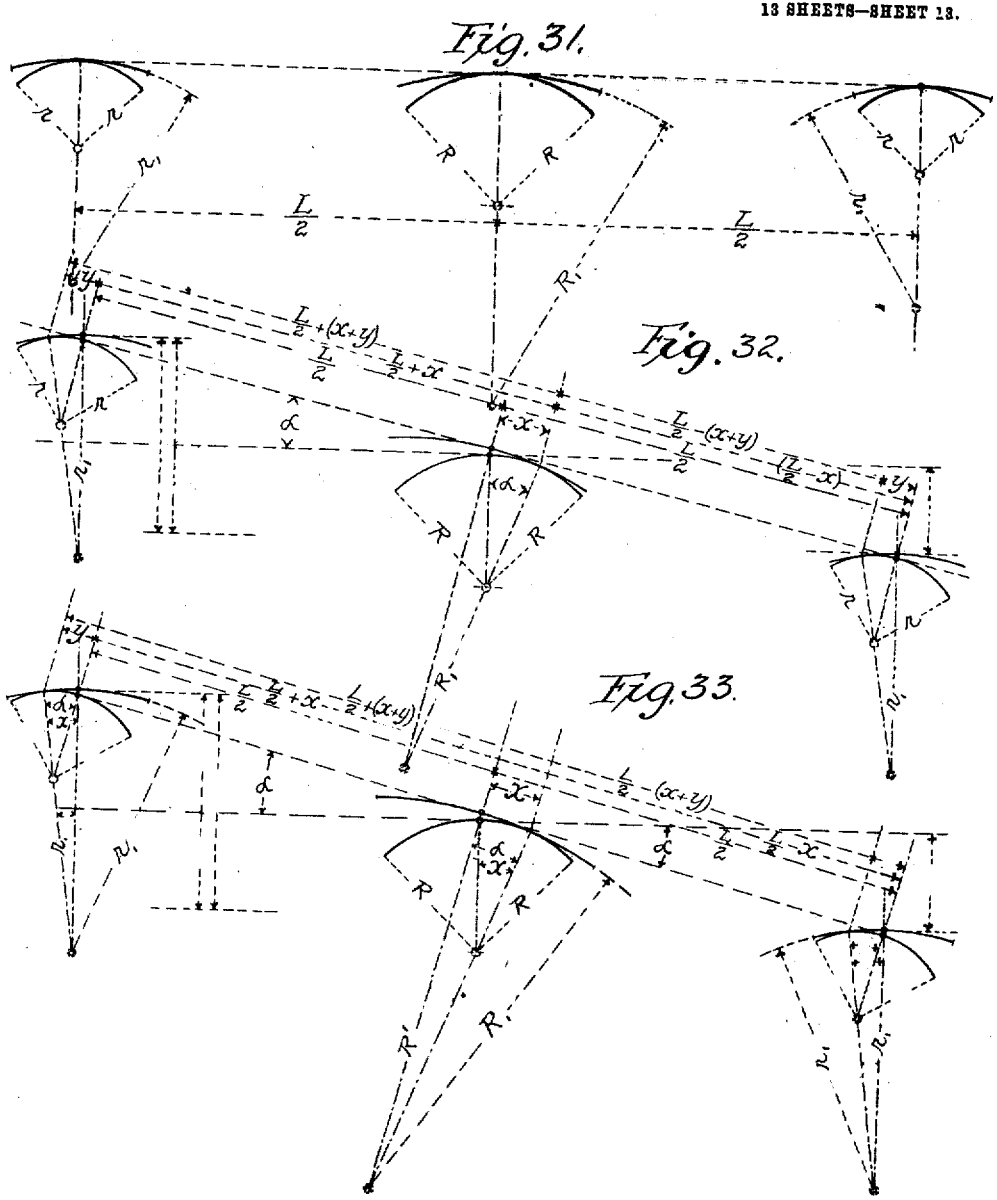

UNITED STATES PATENT OFFICE.

WILLIAM F. BRAUN, OF MUSKEGON, MICHIGAN, AND WILLIAM BRAUN, OF BROOKLYN, NEW YORK.

AUTOMATIC WEIGHING-MACHINE.

No. 844,440.

Specification of Letters Patent.

Patented Feb. 19, 1907.

Application filed November 13, 1905. Serial No. 287,154.

*To all whom it may concern:*

Be it known that we, WILLIAM F. BRAUN and WILLIAM BRAUN, the former of Muskegon, Michigan, and the latter of Brooklyn, New York, citizens of the United States, have invented certain new and useful Improvements in Automatic Weighing-Machine, of which the following is a specification.

Our invention relates to automatic scales, and particularly to means for avoiding the disadvantages and defects incident to the use of cross-knives as the fulcrums or pivots of the beams.

As is well known, knife-edges are employed for the purpose of reducing friction and upon the principle that the scale-beam should pivot upon a line or upon the nearest mechanical approach thereto in order to eliminate rubbing contact. This principle, however, is impossible of embodiment in a material and practical way, for the reason that the nearer we approach the theoretically perfect structure the weaker that structure is in practice. In other words, the knife-edge being little more than a line when subjected to working conditions wears rapidly, and thus quickly produces the very conditions which are intended to be avoided by its use.

In carrying out the invention we have produced an arrangement which will eliminate friction entirely, the contact between the parts of the fulcrum being a rolling one and neither having any movement of translation whatever along or across the surface of the other. With a fulcrum of this character not only is friction and wear eliminated, thus making the scale sensitive, and accurate, but other advantages accrue, due to the change of leverage as the fulcrum member of the beam rolls on the fulcrum member of the frame, said varying leverage making the scale quick in its action and preventing overthrow or tendency in that regard.

The invention consists in the features and combination and arrangement of parts hereinafter described, and particularly pointed out in the claims.

The invention is illustrated in the accompanying drawings, in which—

Figure 1 is a side view of so much of a scale-beam and its receiver and the frame part with their respective fulcrum members as is necessary to a clear understanding of our invention, the scale-beam being in the inclined position it assumes while its receiver is receiving the material. Fig. 2 is an enlarged detail view of the parts of the fulcrum shown in Fig. 1. Fig. 3 is a detail view of the fulcrum-bearing between the scale-beam and the receiver. Fig. 4 is a detail view of the means for accurately balancing the scale-beam. Fig. 5 is a view similar to Fig. 1 with the scale-beam in a horizontal position. Fig. 6 is a detail view of the fulcrum parts of Fig. 5 enlarged. Fig. 7 is a cross-sectional view through the fulcrum parts at right angles to Fig. 6. Fig. 8 is a plan view of the scale with the upper fulcrum member removed, together with a portion of the scale-beam, to better show the structure of the lower fulcrum member. Fig. 9 is an enlarged view of a section taken transversely through the members of the fulcrum. Fig. 10 is a cross-sectional view of the scale-beam and the fulcrums and showing certain frame parts in elevation. Fig. 11 is a view similar to Fig. 1 with the scale-beam tipped in the opposite direction from the position shown in said figure. Fig. 12 is a detail view, enlarged, of the fulcrum members similar to those shown in the above figures, but reversed in position, the member with the flat face being below, while the member with the rounded or rolling face is on top. Fig. 13 is a sectional view of the parts shown in Fig. 12, but taken transversely of the fulcrum. This figure shows also a modified arrangement of the members of the fulcrum. Fig. 14 is a plan view of the lower member of the fulcrum shown in Fig. 13. Fig. 15 is a detail view of the fulcrum connection between the scale-beam and the receiver. Fig. 16 is a view of the fulcrum members similar to Fig. 12, showing the beam with the fulcrum member in a different position from that of Fig. 12 and with the fulcrum connection of the receiver. Fig. 17 is a view of the two fulcrum members with parts omitted. Fig. 18 is a view of a scale-beam with the fulcrum members having each a curved bearing-surface. Fig. 19 is a detail view of a similar fulcrum arrangement for the beam and receiver. Fig. 20 is a view similar to Fig. 18, but with the parts in a different position—*i. e.*, with the scale-beam tipped toward the right. Fig. 21 is a view of the fulcrum parts as employed between the beam and receiver in the position assumed by them when the beam is in its tipped position. Fig. 22 is a detail view of a roller employed instead of a ball as the retaining device for the scale-beam, the parts being in the tipped position of the beam. Fig. 23 is a view similar to Fig. 22, but with the parts in the horizontal position of the beam. Fig. 24 is a plan view of the lower fulcrum member of Figs. 22 and 23. Figs. 25 and 26 are detail sectional views, enlarged, of the fulcrum, with the parts in horizontal and tipped positions, respectively, and with the ball as a controlling device between them. Figs. 27 to 33 are diagrams representing the operation of the beam and fulcrum members.

Referring to Figs. 1 to 11, the scale-beam is shown at 1 and the frame at 2. The scale-beam comprises the side members 1 1'', between which are arranged the receiver 3 and the weight 4 and which are suspended from the ends of the said side members, as will be hereinafter described. These sides are connected by a cross brace or rod 5, being held firmly thereto by the screws 6, Fig. 10. This cross rod or shaft is square in cross-section, accurately fitted to similarly-shaped openings in the sides of the beam to prevent all possibility of slipping or displacement about the said shaft.

The frame comprises the side standards 2' 2'', bolted to the base 7 and connected together by the cross brace or bar 8, which also is rectangular in cross-section. This cross bar or brace supports the lower members of the fulcrum, which consists in this form of the invention of brackets or castings 9, secured to the cross brace or bar by the screws 10. Each bracket supports in turn the lower fulcrum-blocks 11, which are held thereto by the screws 12.

In the embodiment of our invention now being described these fulcrum blocks or members are rounded on their upper surfaces in the direction in which the beam swings, the arc of curvature being indicated in Fig. 4 by the line *a b*. These fulcrum members cooperate with fulcrum blocks or members carried by the beam, which latter blocks are shown at 13, being bolted or otherwise secured to the side members of the scale-beam. These upper fulcrum-blocks are flat-faced, as indicated by the line *c d* in Fig. 1, and they rest on and are adapted to roll upon the corresponding lower fulcrum-blocks. The lower fulcrum-blocks are grooved in a direction longitudinally of the curved surface, and the grooves form ribs or lines 11ª, on the upper edges of which the upper fulcrum-block rolls. By this construction the fulcrum will free itself from dirt and other accumulations, which will pass down into the grooves and will then be discharged, and the rolling action will be rendered easier. Any particles of foreign substance lodging on the fulcrum-block will be cut by the sharp edges, and thus the movement of the beam will not be interfered with.

It will be seen that with the fulcrum constructed as above described, with the one member having a rolling contact with the other, no frictional wear on the parts will be caused, and while, in effect, we secure all the results from the theoretically-perfect knife-edge bearing we avoid the defects and disadvantages found in practice to exist in a bearing of this character presenting only a single line to receive the weight of the parts and the wear. With the rolling surface, however, the frictionless characteristic is preserved, while at the same time the rounded surface, in effect, presents a series or infinite number of "line-bearings," each of which is supported against the wear or against being broken down by the support afforded by the adjacent material. An important result is also attained by the rolling form of fulcrum, as will now be described.

Referring to Fig. 1, in which the scale-beam is tipped to the right and the receiver is elevated to receive the material from the hopper, it will be noticed that the point of contact between the upper and the lower members of the fulcrum will be necessarily at a point to the right of the vertical plane passing through the center of the machine—for instance, on the line *x y*, Figs. 1 and 4. Hence at this time the two arms of the scale-beam will be of unequal length, the receiving end being the longer, and therefore the beam will begin to tip at a point earlier in the feeding operation than would otherwise be the case—that is, for instance, if the scale-beam rested on a knife-edge bearing and the two arms of the beam—that is, the arms on either side of the fulcrum—were of the same length. In our arrangement the leverage as between the two arms of the beam is in favor of the receiver end of the beam, and this increased length of the receiver-arm gives the beam an early start and a quick initial movement not requiring, as in many scales, the impact resulting from the fall of a column of material of considerable height in order to start the beam to tipping. Further, in our scale the leverage as between the two arms of the scale-beam is constantly changing as the tipping of the beam proceeds from the position shown in Fig. 1 to the horizontal, the difference in the length of the two arms constantly growing less until when the horizontal position is reached the length of the two arms is the same. At this point the feed into the receiver, which has been gradually growing less as the beam nears the horizontal and the lever-arms become equal in length, ceases altogether, and the beam is balanced. This variable ratio in the lengths of the lever-arms brings the beam to a horizontal position quietly and without shock or tendency to overthrow by reason of its momentum, as the difference in length of the lever-arms becoming gradually less and the scale-beam throughout having been moved by the actual weight of the material being fed rather than by the impact or fall of the material will be moving without undue speed as it approaches the horizontal. As the beam approaches its horizontal position it continues to require the proper, though constantly diminished, amount of material fed thereto, and this feeding action continues until the horizontal position is reached, just the right quantity of material being fed at the last movement to bring the beam to a balanced position.

In connection with a scale having the rolling fulcrum described certain means of control have been devised by us to act on the beam and prevent its displacement in relation to its fulcrum.

As a means of preventing lateral and longitudinal displacement of the scale-beam in relation to the fulcrum and frame we provide a retaining device which will accommodate itself to the varying relation between the scale-beam fulcrum member and the fulcrum member located on the frame. This consists in one embodiment of the invention of a ball 14 between a part on the frame and a part on the scale-beam. These parts for the ball consist of blocks 15 16, having concaved opposing faces or sockets 17, forming each a portion of the surface of a sphere.

The degree of curvature of the face of the socket is less than that of the periphery of the ball to allow a certain amount of play of the ball and to allow the ball to center itself at the bottom of the concave, and thus accurately determine the position of the beam.

The lower block 16 for the ball fits in a recess 18 in the bracket or block and is pressed normally upwardly by a spring 19, held in a cavity 20 of the lower bracket of the fulcrum. The upper block is suitably held in the upper bracket of the fulcrum by a pin 15$^a$.

Referring to Fig. 2, it will be noticed that the ball or retaining device is indicated in dotted lines in the position it occupies when the beam is in a horizontal position and that when the beam tips and the point of contact between the fulcrum members shifts to line $x\,y$ the surface of the upper fulcrum member at the point centrally over the ball will have raised or separated in relation to the lower fulcrum member; but notwithstanding this the connection between the two members, intended to prevent the displacement of the one in relation to the other, will remain effective, because the ball under the action of the spring 19 will rise from its dotted-line position to that shown in full lines in said figure and hold the scale-beam accurately in place laterally as well as longitudinally, so that the members of the fulcrum will operate as intended. The spring 19 is of sufficient strength to overcome the weight of the block 16 and ball 14.

In order to provide a safeguard against the slipping of the upper fulcrum member upon the lower when the scale-beam is tipped, we provide intermeshing members adjacent the fulcrum members, composed of the teeth 21 on a plate 22, bolted to the scale-beam, and the teeth 23 on a plate 24, bolted to the bracket of the lower fulcrum member. These teeth intermesh like gear-teeth when the beam is tipped, and those associated with the curved member of the fulcrum form a segmental gear the pitch-line of whose teeth is in the same plane as the curved surface of the fulcrum member. Likewise the pitch-line of the upper set of teeth coincides with the plane of the flat surface of the upper fulcrum member. These teeth are located only at points opposite the ends of the fulcrum members. It will be understood that these teeth are provided merely as a safety device to prevent the slipping of the upper fulcrum member upon the lower member when the beam is tipped—as shown, for instance, in Fig. 1. They do not perform any function when the operation of weighing is being consummated—that is, at the time the beam is at or approaching a balanced position—for it will be noticed from Figs. 5 and 6 that at this time the teeth on the respective fulcrum members are out of contact with each other. In other words, the teeth associated with the respective fulcrum members are intended to maintain the fulcrum members in proper relation to each other when the beam is in its tipped position, and one member might slip on the other, and while the teeth are in contact with each other at this time it is not a detriment to the proper working of the scale, for the beam is now receiving the bulk of its load, and consequently is being subjected to the greatest force tending to move it; but when the beam nears its balanced position and the material being fed is greatly reduced in quantity then the teeth are out of contact, as will be seen from Figs. 5 and 6, and the sensitiveness of the scale will not be interfered with by the use of these controlling-teeth.

The relation of the several parts of the fulcrums, as described above, will be clear from Figs. 1, 8, 9, and 10, from which it will be seen that the ball-retainer or centering device is arranged centrally of the fulcrum, while in line therewith are the toothed segments for preventing slipping movement of the beam fulcrum member on the frame fulcrum member, while on each side of these parts the bearing-surfaces of the fulcrum are arranged, the fulcrum-bearing itself being in two sections, as shown, one section lying on each side of the central bearing. Instead, however, of forming the fulcrum-bearing surface in sections, as just described, we may, as in Figs. 12, 13, and 14, form the bearing-surface in one continuous section or piece, as at 11, and locate the retaining device—i. e., the ball and the toothed segments or intermeshing parts—outside of the fulcrum proper. By this construction we may make the beam narrower than with the construction first described. It will be understood that there is a fulcrum, such as above described, at each side of the beam, this being clearly illustrated in Figs. 8 and 10.

The rolling fulcrum can be embodied in other constructions than that above described, in all of which, however, like the described form, the opposing surfaces of the fulcrum are non-concentric in order to secure the rolling effect. In the form described a flat upper fulcrum-surface works in conjunction with a lower curved surface. In Figs. 12, 15, 16, and 17, however, the parts are reversed in position, the curved fulcrum-surface being uppermost, while the flat or straight surface is lowermost. The upper curved member in this instance rolls on the lower member with all the effects and advantages described above. Again, instead of employing a flat-faced fulcrum member to roll on or be rolled upon by the curved or rounded fulcrum members both members may be curved, as shown in Figs. 18 and 19, the said surfaces, however, being non-concentric and giving all the beneficial results mentioned above.

I do not limit myself to the arrangement shown in which the larger arc is uppermost.

In all the above modifications the controlling devices, consisting of the ball or its equivalent and the intermeshing teeth, are employed.

The connection between the beam and the receiver is a pivotal one, and the same is true of the connection between the beam and the weight. Both of these fulcrums have all of the essential characteristics of the beam-fulcrum above described, it being noted from Fig. 1, for instance, that the flat fulcrum-surface is on the receiver 3, and this rests and rolls upon the curved fulcrum member on the end of the scale-beam. A like fulcrum is used between the weight 4 and the beam.

In Figs. 15 and 16 the fulcrum members between the beam and the receiver and weight, respectively, are reversed in respect to those described, in that the curved member is uppermost, and in Figs. 18, 19, 20, and 21 the fulcrum members between the beam and the receiver and weight, respectively, are both curved. Instead of using a ball as the controlling and centering device for the beam a roller may be employed, as shown at 30 in Fig. 22, this being spring-pressed like the ball above described. This roller has beveled edges.

In order to secure an accurate poise of the beam, we employ a pea longitudinally adjustable of the beam in a special manner. This pea consists, as in Fig. 1, of a weight 27 and a clamp consisting of two parts 28. The weight is screw-threaded and adapted to be adjusted by turning the same on the screw-threaded extension 29 of the scale-beam. When the proper position is reached, the pea is secured firmly in position by the bolts or screws 29$^\times$, which will draw the two members of the clamp into firm contact with the split screw-threaded weight and clamp it to the rod. This form of adjustable pea has the advantage that when once its correct position along the screw-rod is determined it is possible to fix it in position without destroying the poise. This, however, is not possible where, as in many forms of poise, a lock-nut is employed on the screw-rod, which in the act of turning up against the poise necessarily alters its own position on the screw-rod extension, and thus throws the beam out of balance to that extent.

In Fig. 8 we show a modified form of pea in which the weight is screw-threaded and has a recess for a key 30$^\times$, which also is screw-threaded. When the weight has been adjusted to its proper position on the screw-rod, it is clamped thereon by the screws 31, passing through the weight and against the key to press the same into locking contact with the screw-threaded rod.

We do not limit ourselves to the number of lines or ribs 11$^a$ forming the rolling fulcrum, as one or more may be employed.

By the term "non-concentric" as applied to the fulcrum members we wish it understood that we do not necessarily mean that the said members each present a curved surface for contact with the other and that these curves are not concentric; but this term is meant to include any forms of fulcrum members in which the rolling effect here described is secured in contradistinction to a rubbing or turning action of one member about the other.

We prefer the ball arrangement as the retaining device as this will allow for the lateral expansion and contraction of the parts of the scale without binding, the balls being free to roll slightly in a lateral direction in their sockets. Further, the ball acts as a centering device for the scale-beam, as it will constantly seek its proper position at the bottom of the concave sockets with which it engages. Its function is not only to prevent lateral displacement, but also longitudinal displacement.

The form of fulcrum in which the flat bearing-surface is used below the rounded coacting surface has the advantage of not being liable to the slipping of the beam on the lower fulcrum-surface.

Having described the structure and operation of the invention, reference is now made to the diagrammatic view 27 to 33.

In Fig. 27 the beam is represented in its position of equilibrium.

Fig. 28 shows the beam in the position with the receiver up ready to be filled. The rolling-surface is a segment of a circle of twelve inches diameter or six inches radius. The angle $a$ is twenty-two and one-half degrees. dividing the circumference of the circle or arc into sixteen parts of 37.699 or 2.35 inches, which distance is indicated in the diagram by the letter $x$. It will thus be seen that the lever-arm at the receiver end of the beam has gained in length the distance $x$ = to 2.35 inches. If we observe what influence this movement has at the end of the beam, it will be seen that the touching point of the receiver-fulcrum with the segment of the beam has moved out the distance $y$, or the sixteenth part of the circumference of the circle of eight inches diameter, or 1.57 inches, which means that the lever of the receiver-arm of the beam has increased in length the sum of $x$ and $y$, or, in this case, 4.92 inches. Naturally the lever-arm on the side of the weight has become correspondingly shorter. Calling the length of the lever-arm from the center to each side $\frac{L}{2}$ and accept nineteen inches as an example, if we also designate a weight of one thousand pounds as the quantity to be weighed, then we shall get the following formula to find out at what weight, designated by the character $w$ in the receiver, the beam would begin to move.

$$w\left(\frac{L}{2} + 4.92\right) = 1000\left(\frac{L}{2} - 4.92\right)$$

or $$w(19 + 4.92) = 1000(19 - 4.92)$$

or $$w\,23.92 = 1000 \cdot 14.08$$

or $$w = 14080 : 23.92 = 588.6 \text{ pounds.}$$

This shows, leaving out of consideration any momentum of the infalling material, that the beam would begin to move downward after 588.6 pounds of material has been delivered into the receiver and that the rest of the one thousand pounds—i. e., four hundred and twelve pounds—has to be added on the movement of the beam from the highest position to the horizontal line or the line of equilibrium.

As the lever-arm of the receiving side gets shorter in moving downwardly and the resisting lever-arm where the weight is grows in the same proportion longer, it shows at once that the scale in its movement from its highest point to the position of equilibrium is always in need of more material, but in constantly-diminishing amount, thus excluding the possibility of overthrow of the beam by momentum and guaranteeing scientific weighing.

In Figs. 29 and 30 the same effect is produced by having the round surface above on the beam coacting with a flat straight surface on the frame and having also this same relation of straight and rounding contacting parts at the weight and receiver fulcrums.

In both the above cases the angle of inclination of the beam in its tipped position is equal to the angle $a$, or twenty-two and one-half degrees in the example given.

In Fig. 31 the weighing-beam is shown in horizontal position, and the use of two circular surfaces of different radii is shown here. The surface of the longer radius rolls on the surface of the smaller one. Supposing the radius R equal to six inches and the radius $r$ equal to four inches, as in the above example, and the radius $R_1$ of the bigger circle equal to two and one-half R, or fifteen inches, or the radius $r_1$ equal to two and one-half $r$, equal to ten inches, then we see from Fig. 32, representing the beam in its highest position, that we get the same results of lengthening and shortening the two lever-arms.

Fig. 33 shows an arrangement where $R_1$ is made three times as long as R, or eighteen inches, and correspondingly $r_1$ is equal to three $r$, or twelve inches. In this case the angle of inclination is smaller or equal to fifteen degrees. From this it is to be seen that in cases where the space in height for installing a machine is limited the extent of the vertical movement of the receiver, and therefore the total height of the machine, can be made suitable by selecting a radius of proper length.

The same effect can be secured in each of the other cases solely by increasing or decreasing the radius R and $r$.

It will be noticed from the above that the beam is unconnected and free to balance. By this we mean that the beam is not connected with any registering or indicating device through mechanical elements which must derive their power from the movement of the beam; but, on the contrary, the beam in our invention is perfectly free to assume its balanced position without hindrance or restraint, which results where the beam is employed to set in motion connections leading to a registering or indicating apparatus.

We claim as our invention—

1. In combination in a weighing-scale, a frame, a beam, a fulcrum between said parts comprising the contacting non-concentric members, one of which has a rolling movement on the other, and means for retaining the said members in operative relation to each other, comprising a yielding device at the center line of the fulcrum members projecting from one part into the other, substantially as described.

2. In combination in a weighing-scale, a beam, a frame, fulcrum members, one having rolling contact with the other, and a ball and socket arranged at the center of the length of the beam-arms forming a retaining device between the frame and the beam, substantially as described.

3. In combination in a weighing-scale, a beam, a frame, fulcrum members, one having rolling contact with the other, a ball and socket arranged at the center of the length of the beam-arms forming a retaining device between the frame and the beam, and a yielding bearing, substantially as described.

4. In combination in a weighing-scale, a frame, a beam, and fulcrum members between said parts, one member having a plain surface rolling upon the other member and yielding means between said members to control them in their action, substantially as described.

5. In combination in a weighing-scale, a frame, a beam, and fulcrum members between said parts, one member having a plain surface and the other having its surface provided with a rib or ribs in the direction of movement of the beam, said surfaces rolling one upon the other, substantially as described.

6. In combination in a weighing-scale, the frame, the beam, fulcrum members between them having rolling contact parts, and the intermeshing teeth to prevent displacement of the coöperating fulcrum members, said teeth meshing when the beam tips and being free from frictional contact with each other when the beam is at or near balanced position and the act of weighing is to be performed, substantially as described.

7. In combination in a weighing-scale, a frame, a beam, fulcrum members between them having parts in rolling contact and controlling-teeth in line with the end portions of the said rolling parts, the teeth being interrupted opposite the center of said parts, substantially as described.

8. In combination in a weighing-scale, a frame, a beam, fulcrum members having rolling contact, means for retaining the fulcrum members against displacement comprising a ball and sockets between them.

9. In combination in a weighing-scale, the frame, a beam, fulcrum members having rolling contact, yielding means at the center of the beam for preventing lateral displacement, and means for preventing displacement of the beam in the direction in which the beam tips, substantially as described.

10. In combination in a weighing-scale, the frame, a beam, fulcrum members having rolling contact, means at the center of the beam for preventing lateral movement of the beam and the teeth on opposite sides of the said means for preventing slipping of the beam, substantially as described.

11. In combination in a weighing-machine, a frame, a beam, fulcrum members between said parts having a rolling contact, and yielding controlling means maintained at one point in relation to the length of the beam to prevent displacement of said fulcrum members, substantially as described.

12. In combination, the beam, the frame, fulcrum members having a rolling contact with each other, and a ball arranged at the center line of the fulcrum, and concave sockets with which the ball engages, one of said sockets being yieldingly controlled, substantially as described.

13. In combination in a scale, the beam, the frame, fulcrum members allowing one to roll on the other, a yielding centering device at the center line of the beam, and means on opposite sides thereof for retaining the beam in proper relation when tipped, substantially as described.

14. In a weighing-scale, the combination of a beam, a frame and fulcrum members between said parts, the frame member being ribbed and the beam member being curved and flat to roll on the apices of the ribs of the frame member to vary the relative lengths of the lever-arms, substantially as described.

15. In combination in a weighing-scale, the frame, the beam, fulcrum members between them having rolling-contact parts and means to prevent displacement of the coöperating fulcrum members when the beam tips, said means being out of action when the beam reaches a balanced position, substantially as described.

16. In combination in a weighing-scale, the frame, the beam, fulcrum members between them having rolling-contact parts, intermeshing parts carried by the fulcrum members for preventing displacement of the beam when it tips, said parts being out of frictional contact when the beam is about to assume balanced position, substantially as described.

17. In combination a scale, the beam and frame with fulcrum members and yielding controlling means between the fulcrum members, maintained at the center of the beam's length and moving upon the separating and closing movement of the fulcrum members, substantially as described.

18. In combination in a scale, the beam and frame with fulcrum members and a ball-and-socket controlling device between said members, substantially as described.

19. In an automatic weighing-machine the combination of a balancing-beam, a receiver at one end and a weight at the other end, fulcrum members between the beam and the frame having rolling surfaces which are short as compared with the length of the beam and which are plain in the direction of movement of the beam, and fulcrum members between the beam and the receiver and weight respectively, each of said fulcrum members having rolling contact with its companion member and being plain in the direction of movement of the beam, and each of limited length as compared with the length of the beam, substantially as described.

20. In combination, in a weighing-scale, a frame, a beam, a fulcrum between said parts comprising the contacting non-concentric members, one of which has rolling movement on the other, and means at the center of the beam for retaining the members against both lateral and longitudinal displacement in relation to each other, substantially as described.

21. In combination, in a weighing-scale, a frame, a beam, a fulcrum between said parts comprising the contacting non-concentric members, one of which has rolling movement on the other and means maintained at one point in relation to the length of the beam for preventing its displacement, said means comprising a rolling device between the fulcrum members, substantially as described.

22. In combination in an automatic weighing-machine, a frame, a free beam having a weight-carrying arm and a receiver-carrying arm with a fulcrum at the center of said beam where said arms join, said fulcrum being short as compared with the length of the beam and comprising non-concentric members having their bearing-surfaces plain in the direction of movement of the beam whereby one member has free rolling movement on the other, a receiver on the receiver-arm and a weight on the weight-arm, said beam being unconnected and free to balance, substantially as described.

23. In combination in an automatic weighing-machine, a frame, a beam having a weight-carrying arm and a receiver-carrying arm with a fulcrum at the center of said beam where said arms join, said fulcrum comprising non-concentric members having their bearing-surfaces plain in the direction of movement of the beam whereby one member has free rolling movement on the other, a receiver on the receiver-arm and a weight on the weight-arm, and means at the fulcrum for controlling the longitudinal relation between the beam and frame, substantially as described.

In testimony whereof we affix our signatures in presence of two witnesses.

WILLIAM F. BRAUN.
WILLIAM BRAUN.

Witnesses:
C. F. REINNEAM,
ERNEST COLER.